April 17, 1962 O. H. SCHMITT 3,030,502

AUTOMATIC RADIO SPECTRUM MONITOR

Filed March 14, 1947 3 Sheets-Sheet 1

INVENTOR.
Otto H. Schmitt

BY M. C. Hayes

ATTORNEY

AUTOMATIC RADIO SPECTRUM MONITOR

Filed March 14, 1947 3 Sheets-Sheet 2

INVENTOR.
Otto H. Schmitt

BY M. O. Hayes

ATTORNEY

April 17, 1962 O. H. SCHMITT 3,030,502

AUTOMATIC RADIO SPECTRUM MONITOR

Filed March 14, 1947 3 Sheets-Sheet 3

INVENTOR.
Otto H. Schmitt

BY M. C. Hayes

ATTORNEY

United States Patent Office 3,030,502

Patented Apr. 17, 1962

3,030,502

AUTOMATIC RADIO SPECTRUM MONITOR

Otto H. Schmitt, Mineola, N.Y., assignor to the United States of America as represented by the Secretary of the Navy Filed Mar. 14, 1947, Ser. No. 734,759

6 Claims. (Cl. 250—17)

This invention relates to radio communication. Among its objects are to provide an electronic frequency measuring, registering or "memorizing" system; to provide a system for synthesizing the frequency or frequencies of the various signals detected by a receiver within a band during a "listening" interval; and to provide subcombinations, such as a frequency discriminator and a tripped oscillator, which are specially adapted for accomplishing the broader objects. In a larger scope, the object of the invention is to devise a system for monitoring all parts of an allocated frequency band simultaneously, to "memorize" such signals and later to transmit sustained carriers, optionally modulated, at each of those frequencies for which there was a detected signal.

In accomplishing the foregoing objects, the band in the radio spectrum is separated into a relatively large number of channels the center frequencies of which correspond to the natural frequency of associated, normally quiescent oscillators which are also provided. When a signal is detected the frequency of which closely approximates that of one of the oscillators, that oscillator is tripped into sustained oscillation. The action is similar to the sympathetic vibration of one string of a harp when all the strings are subjected to a sustained single-pitch sound wave, except that in this instance the oscillator remains in operation after the stimulus disappears. By providing a sufficient number of oscillators and associating with each of them an indicator such as a neon tube, all of the radio signals within a band that are detected during a "listening" interval will register in this radio spectrum analyzer.

Following a "listening" interval, the tripped oscillators may be utilized jointly to drive a broadband radio-frequency power amplifier and thus to reproduce approximations of all the radio frequencies previously detected.

It may not be practical to divide the band to be monitored into a sufficiently large number of oscillator channels such that the frequency of the tripped oscillator will be satisfactorily close to the frequency of the detected signal. A secondary or interpolation bank of oscillators is arranged to be tripped by the beat frequency of any primary tripped oscillator and the stimulating signal. A close approximation of that signal may be obtained by mixing the output of the tripped primary and interpolation oscillators. The synthesized signal will contain the close approximation of the detected signal frequency even though it may additionally contain a number of extraneous frequencies.

Any detected carrier may be modulated with one or more audio frequencies. The signals may be demodulated, impressed on an audio bank of tripped oscillators, and utilized to modulate the combined signals from the other tripped oscillators.

In order to separate the detected signals so that only the desired oscillators are tripped, a specialized form of frequency discriminator circuit has been devised, as has a normally quiescent oscillator capable of being tripped, both of which are necessary for the practical embodiment of the broader aspects of this invention. These novel features and others not specifically mentioned will be understood from the following detailed description, the appended claims, and the drawings in which:

Figure 1:
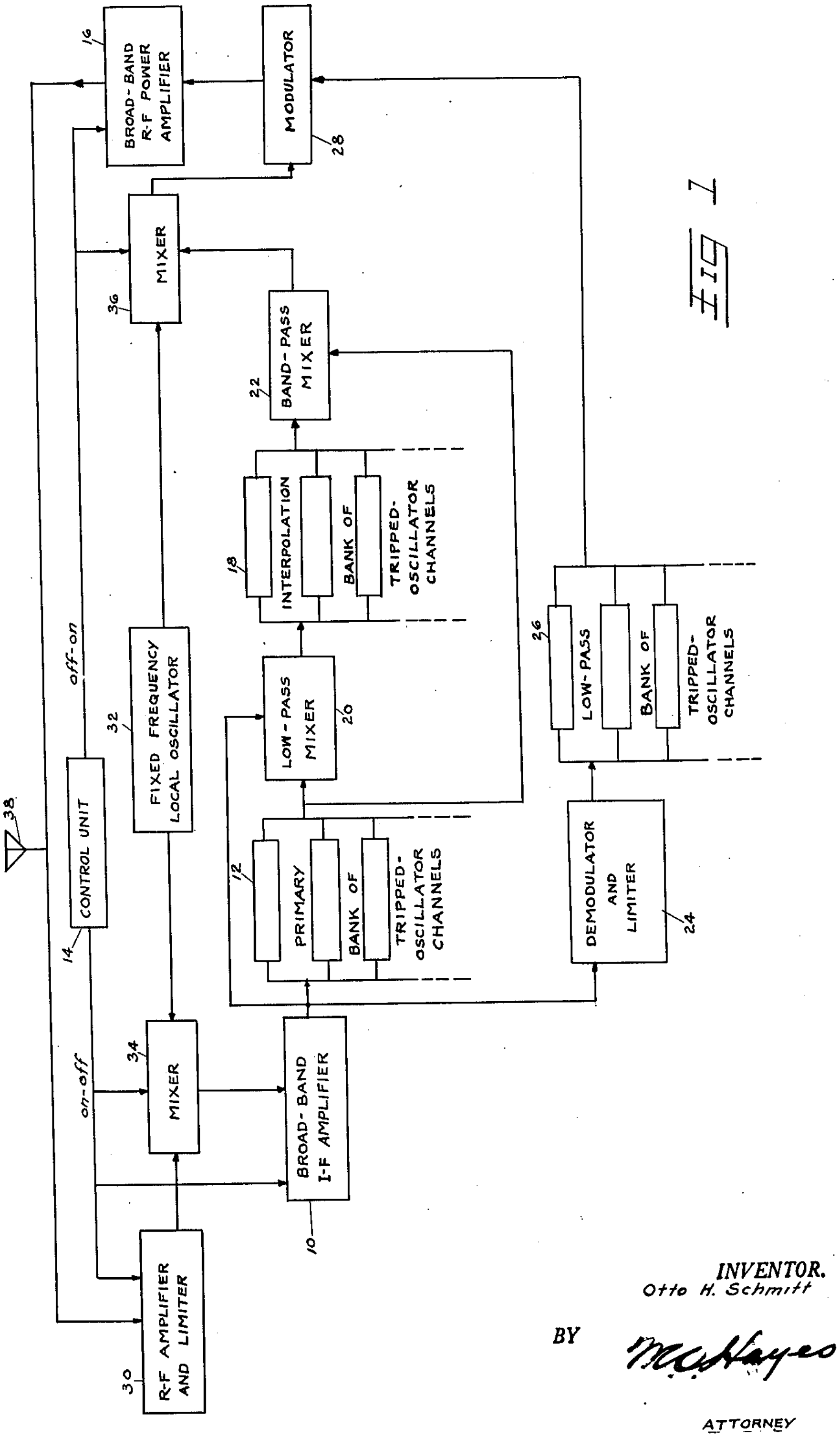
FIGURE 1 is the block diagram of an illustrative form of the invention in its broad aspect.

Referring to FIGURE 1, the signal to be analyzed is impressed on a broad-band amplifier 10 which drives multiple channels 12. Each channel includes a frequency discriminator and an oscillator the center frequency of which is the same as that of the related discriminator. The several channels cumulatively cover the band of frequencies to be monitored. Each oscillator optionally furnishes an indication, when it is tripped, as by lighting a neon tube. Where a band of frequencies is detected, such as that to be expected for a frequency-modulated carrier, multiple adjacent oscillators may be tripped. In order to prevent all of the oscillators from being tripped by a carrier signal which rapidly sweeps across the entire band being monitored, the time constants of the oscillators may be arranged to require a minimum-duration impulse. Control unit 14 initiates and terminates a "listen" period during which broad-band amplifier 10 is effective. The control unit may also be arranged to control radio-frequency power amplifier 16 which is suitably arranged to transmit radio signals originating in tripped oscillators 12, as will be explained.

The frequency of any given tripped-oscillator may not be sufficiently close to that of the detected signal for the results desired. In that event, an interpolation bank of tripped-oscillator channels 18 may be provided. The output of broad-band amplifier 10 which includes the detected signal that tripped one of the oscillators in channels 12 is impressed on a low-pass mixer 20, together with the signal from the tripped oscillator. The difference frequency between the tripped oscillator and the incoming signal is arranged to trip one of the interpolation oscillators 18. The output signals of all the tripped channels 12 and 18 are then mixed in band-pass mixer 22 so that the signals of oscillators 12, and the sum and difference frequencies of channels 12 and 18 will appear in the output of mixer 22. Either the sum or the difference frequency is the desired approximation of the detected input signal, but all of these signals are caused to drive power amplifier 16.

One or more of the detected signals from amplifier 10 may carry a sustained modulation tone. These signals may be demodulated and limited in unit 24 and may trip one or more of the oscillators in channels 26 of a series of audio or modulation-frequency tripped-oscillators. The output of audio or low-pass oscillator channels 26 may, through modulator 28, be utilized to modulate the synthesized carrier signals. While each of the detected modulation frequencies will then modulate all of the carrier frequencies developed in band-pass mixer 22, the resultant signal will nevertheless include one signal which is a good approximation of both the carrier and the modulation frequency which tripped the oscillators in channels 12, 18 and 26. Any of the oscillators may be locked out if it is desired to prevent interference with a particular carrier channel.

As indicated above, no more than a single bank of tripped oscillator channels 12 may be required for sufficient accuracy. On the other hand, it may be necessary to carry forward the cascade of oscillator channels 12, 18, etc., for sufficient accuracy, in a process of successive approximation resembling long division. The audio oscillator channels 26 may or may not be deemed necessary. The organization may be relied upon for its monitoring function or for its capacity for generating a synthetic simulation of the detected signal or signals, or for both functions. As contrasted with monitoring systems which sweep the allocated band progressively the present system monitors the entire band constantly. Thus, pulsed signals will be detected by apparatus according to the present invention where progressively sweep-tuning monitors depend for success in signal detection on the coincidence of the sweep tuning and the pulse transmission.

Advantageously, amplifier 10 and band-pass mixer 22 are operated at a mean frequency which differs from that of the band to be monitored. A conventional radio-frequency amplifier and limiter 30 may be used with a fixed-frequency local oscillator 32 and a mixer 34. In this way, a single organization including one or more banks of tripped oscillators may be arranged to monitor various frequency bands, merely by substituting or adjusting the tuning of units 30, 32 and 34. In order to provide a simulation of the received carrier, the output of mixer 22 is then mixed in unit 36 with the signal from local oscillator 32. The output of mixer 36, either modulated in unit 28 or directly if no audio-frequency oscillator channels are used, drives power amplifier 16.

In this broad organization, control unit 14 suppresses the operation of mixer 36 and power amplifier 16 during a "listening" interval, and similarly suppresses the operation of receiving units 10, 30 and 34 during operation of transmitting units 16 and 36. Since the receiver and transmitter portions of the system do not operate concurrently, it may be convenient to use a single antenna 38 as indicated.

From the foregoing, it will be readily apparent that the success of the entire system is predicated upon the provision of a normally quiescent oscillator which may reliably be tripped into operation when a signal the frequency of which is very near that of the oscillator is received. So far as I know, such an oscillator is entirely new. I have discovered, however, that a wide variety of conventional oscillator circuits may be made to function in the above manner merely by providing them with cut-off bias in quiescence and impressing a sufficient input signal when it is desired to trip them. Thus, in FIGURE 2, a familiar Pierce oscillator is shown in each of four channels, corresponding to channels 12 of FIGURE 1. Each oscillator comprises a vacuum-tube amplifier 40, a choke 42 and neon tube indicator 43 in series between B+ and the plate of tube 40, and a frequency-determining piezo-electric crystal 44 between plate and grid of each of tubes 40. There is also provided a grid bias resistor 46 and capacitor 48 for furnishing operating bias during oscillation. Through a resistance network, the nature and function of which will be described, cutoff bias is adjustably furnished from a suitable supply by means of potentiometer 50. The effective section 51 of potentiometer 50 is connected between the grid-return circuits of all the channels and ground. The cathodes of tubes 40 are also grounded.

If a suitable signal is impressed on any grid for an interval long enough to allow build-up of oscillation, additional bias will be developed across resistor 46. Even when added to that provided by potentiometer 50, the resulting bias will not interrupt oscillation. The circuit should be properly proportioned, especially in the provision of an adequate feedback circuit. Once any one of the oscillators is tripped into oscillation, it will continue to operate even though the stimulating signal disappears. Oscillation may be interrupted for a renewed registering interval by applying greatly excessive grid bias or by excessive loading or by discontinuing the plate power, etc. This may be effected at the beginning of each "listen" interval under control of unit 14 by means not shown. The output of each of the oscillators is obtained through the respective coupling capacitors 52. It is important to isolate each oscillator from the others.

Figure 2:
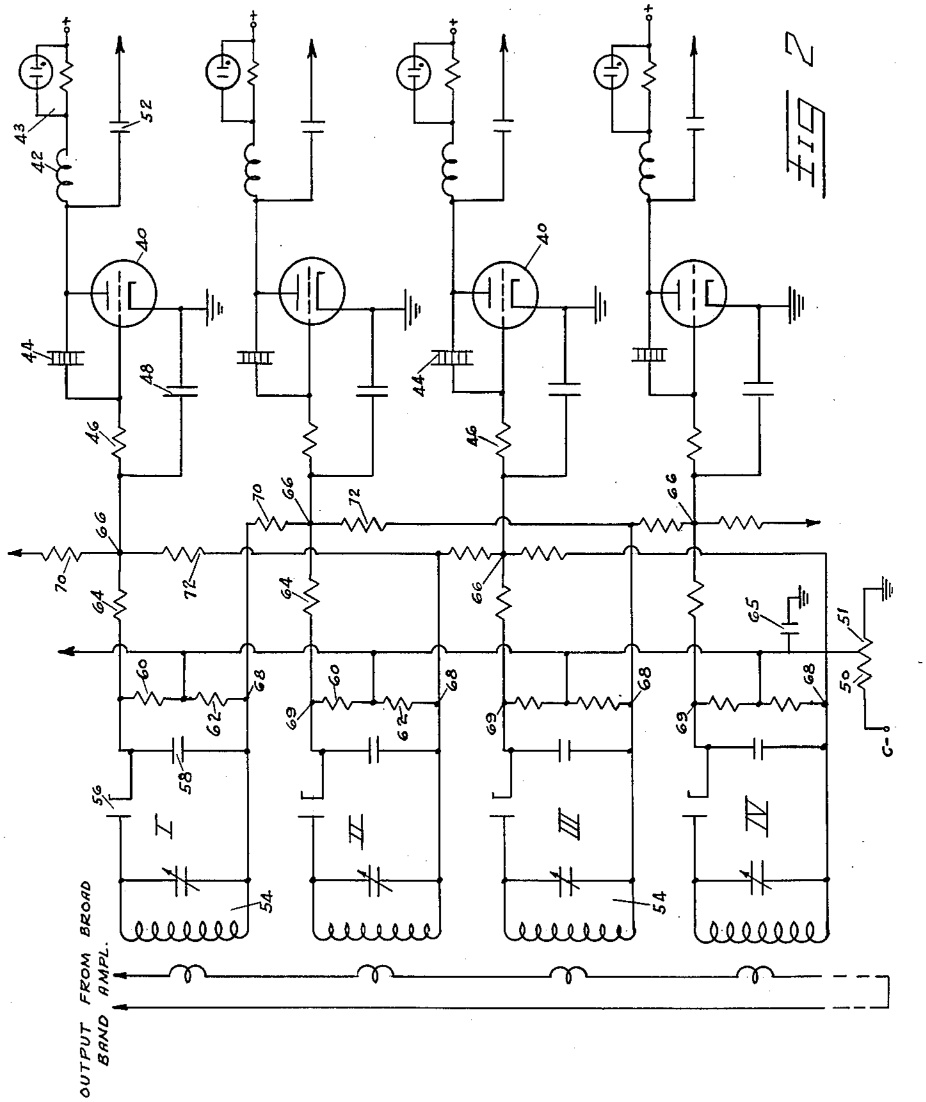
FIGURE 2 is the wiring diagram of multiple discriminator and tripped-oscillator channels.

In FIGURE 2, each of the oscillators is arranged to be tripped into operation by a signal of appropriate frequency as determined by the related LC circuit 54. The A.-C. signal is converted by rectifier 56, capacitor 58 and series resistors 60 and 62 to a direct-current potential opposite in polarity to that developed by the effective section 51 of bias potentiometer 50. Tracing the circuit from the grid of any tube 40 to its cathode, there are resistors 46, 64, 60 and potentiometer section 51 in series. Grid-bias capacitor 48 shunts resistors 51, 60 and 64. Section 51 is common to the grid-return circuits of all the channels, and is bypassed to ground by capacitor 65.

Figure 3:
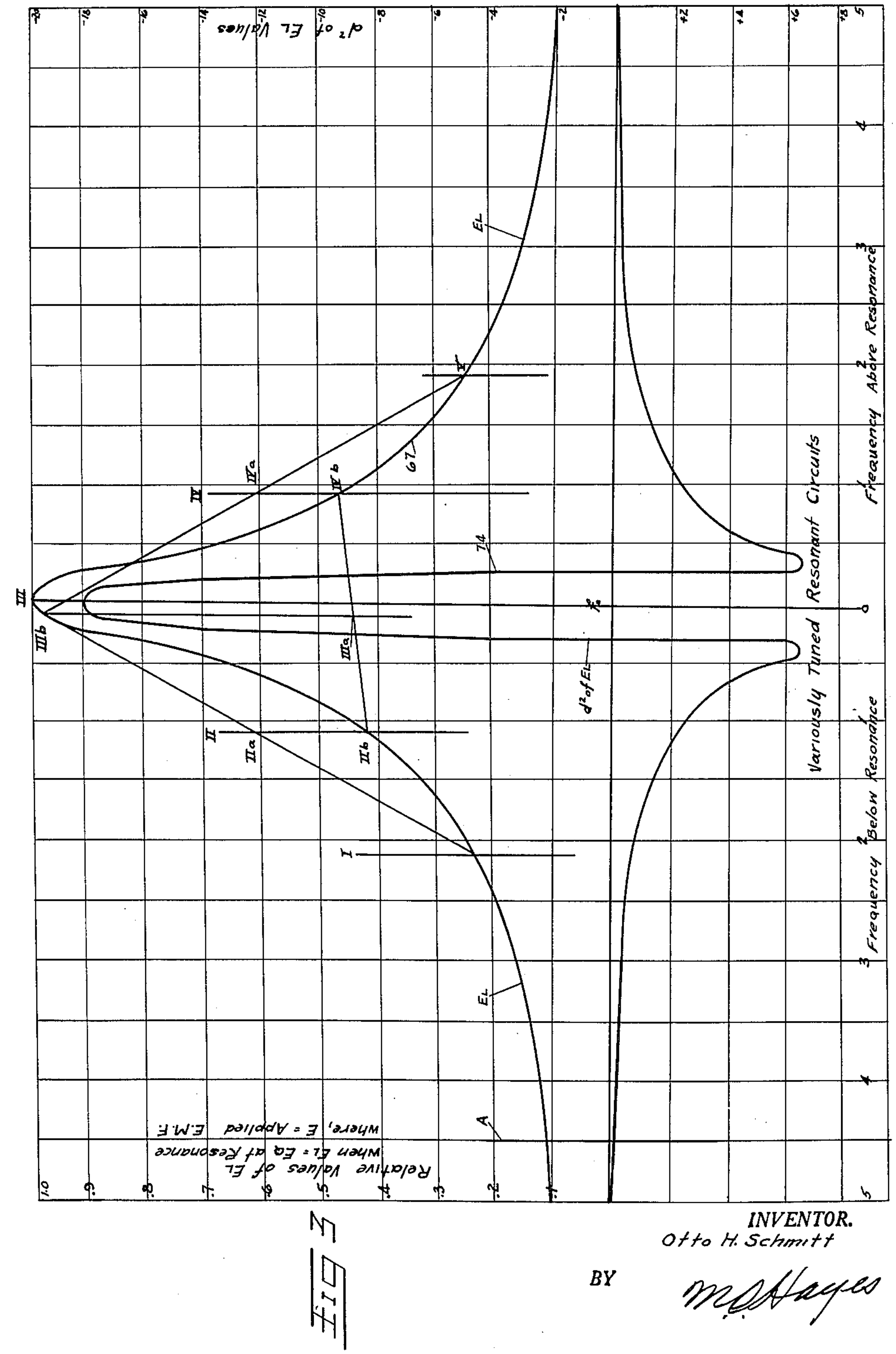
FIGURE 3 is a graph demonstrating the operation of the specialized discriminator.

Were each of the tripped-oscillator channels entirely independent, they would not only be responsive to frequency but would also be variously affected by the amplitude of the signal developed in adjacent-frequency channels. Referring to FIGURE 3, there is shown a curve 67 typical in form to the frequency-response curves of single-tuned LC circuits. Actually curve 67 represents the response to a single frequency $f_0$ of each of a vast number of tuned circuits resonant at progressively different frequencies.

It is evident from curve 67 that a tuned circuit A would yield a signal approximately 11 percent of that obtained from a coil resonant at $f_0$. Tuned circuits from A to $f_0$ and therebeyond to some extent would yield a greater response than 11 percent. However, since signal intensities that are likely to be encountered may have a ratio of thirty to one, it is possible that the oscillator associated with tuned circuit A would be improperly tripped as would a number of additional oscillators for a strong signal of frequency $f_0$. It is desirable that the signal for tripping the oscillators should be as independent as possible of the signal amplitude, so that only that oscillator closest to a given signal should be tripped by it. It is of course recognized that, where a signal is substantially half way between the resonant frequencies of adjacent channels, two oscillators will be tripped.

In order to improve the frequency discrimination, the following novel circuit is proposed. Each junction 66 of resistors 64 and 46 is returned to the opposite polarity terminals of voltage dividers 60, 62 in the adjacent channels from that which furnishes the grid signal. Thus, junction 66 of channel II is returned to the negative terminal 69 of channel I through resistor 70 and to the negative terminal 68 of channel III by means of resistor 72. Resistor 64 of channel II is connected to positive output terminal 69 of resistor 60–II.

In FIGURE 3, it may be assumed that five channels I–V are provided and that their relative response to a signal of frequency $f_0$ will lie along curve 67. As an illustration, it may be assumed that each resistor 70 and 72 are twice the resistance of resistor 64, and that each resistor 60 equals each resistor 62, each of the latter being low in comparison with resistor 64. The voltage at junction 66–II will be found to equal one-half the voltage across resistor 60–II minus one-half the average of the voltages across resistors 62–I and 62–III. In FIGURE 3, the average response II*a* at junction 66–II due to the rectified output of adjacent channels I and III will be negative, and will be greater in value than the positive potential at 66–II due to the volt drop across resistor 60–II represented by II*b* (FIGURE 3). Consequently, the oscillator of channel II will not be tripped. The input signal $f_0$ merely develops a negative voltage for the oscillator of channel II, augmenting the oscillation-suppression effect of resistor 51.

If the average III*a* of the responses of channels II and IV be compared with the response III*b* developed by its own resonant circuit, it is apparent that a large positive difference (III*b* minus III*a*) is available for overcoming the bias across resistor 51 and thus for tripping the oscillator of channel III. While channel V is not shown in FIGURE 2, it will be seen that the average IV*a* of the voltages from channels III and V at junction 66–IV is negative and greater than the response IV*b* of the channel IV input circuit. Consequently, the oscillator of channel IV will not be tripped. The spacing of the resonant frequencies of coils I–V in FIGURE 3 is exaggerated somewhat for better legibility of the drawing.

It can be shown that the arrangement for taking a negative voltage sample from two adjacent channels for comparison with the positive signal developed in any intermediate channel is, to an approximation, a circuit for obtaining the second derivative of response curve 67. Using the resistance proportions given for resistors 60, 62, 64, 70 and 72, it can be shown that the voltages at points 66 are all negative except for that channel or those channels very close to $f_0$. Curve 74 shows the relative voltages at points 66 for a rather large number of closely spaced channels inter-connected as above described.

Generally, the proportions of the resistors need not necessarily be 2:1 as described above. Resistors 70 and 72 may each be three times as large as resistor 64. Other circuits may similarly be arranged for comparing the voltage across any resistor 60 in one channel with the mean of the voltages across resistors 62 in the adjacent two, four or more channels, with different resulting shapes of curve 74. Also, each channel may be spaced from the adjacent channels by equal or unequal small or large steps, depending upon the required accuracy of the approximation when any one oscillator is tripped. The accuracy of the approximation is improved with higher values of Q in the tuned, loaded circuit.

R-F amplifier and limiter 30 is arranged for broad-band coverage and the input signals or any one of them may cause limiter action. Even the weak signals that are received are limited in the presence of a strong signal, and may be inadequate to register in the oscillator bank. If detection of weak signals is imperative, it may be necessary to sacrifice some of the advantages of the broad-band design for amplifier 30 and to replace it with a sweep tuned amplifier having a fast-acting limiter. In this way, a wider latitude of signals can be brought within the voltage tolerance required for tripping the oscillators.

The oscillators and discriminators as described for channels 12 may be duplicated for channels 18. For the low-pass bank 26, it has been contemplated to use variously weighted reeds responsive to a fluctuating magnetic field of appropriate frequency as an alternative for the frequency discriminator and electronic oscillator used in the other channels. The selected reeds or reeds will maintain sustained oscillation as in the familiar tuning fork regulated oscillators. Further refinements of construction, rearrangements and substitution of construction within the various aspects of the invention will occur to those skilled in the art.

What is claimed is:

1. A multi-channel alternating-current frequency discriminator comprising a plurality of distinct channels, said distinct channels each comprising a resonant circuit, an impedance circuit consisting of a capacitor in parallel with impedance means, rectifier means connecting said resonant circuit to said impedance circuit, and second impedance means in each channel interconnecting a point of given polarity on the impedance circuit of its own channel with a point of opposite polarity on the impedance circuit of each adjoining channel, the resonant circuits in said plurality of distinct channels being tuned to progressively different frequencies so that the maximum response frequency of any channel differs from that of any other channel.

2. A frequency register comprising a plurality of distinct frequency channels, each channel associated with a predetermined frequency progressively different from those of its adjoining channels, and each channel comprising a frequency discriminator having maximum response at its predetermined frequency and a normally inoperative oscillator adapted to oscillate at said predetermined frequency when suitably activated, said frequency discriminator comprising an inductance-capacitance tank circuit tuned to said predetermined frequency, an impedance circuit consisting of a capacitor in parallel with two resistors, rectifier means connecting said tank circuit to said impedance circuit so that the A.C. output of said tank circuit is converted into a D.C. bias across said resistors, and impedances interconnecting a point of given polarity on said resistors with a point of opposite polarity on the resistors associated with each of the adjoining channels, said oscillator comprising a three-element tube having a plate, a control grid and a cathode, said cathode being grounded, a piezo-electric crystal connected between the control grid and plate elements, a series resistance-capacitance circuit connected between said control grid and cathode elements, choke means in series with said plate, means for biasing said tube to cut-off, the control grid of said tube being connected to said impedance circuit so that an input signal of said predetermined frequency initiates oscillation, whereby, after a build-up of oscillations, said oscillator will maintain sustained oscillation with said input signal removed, said interconnecting impedances acting to apply said given polarity to said adjoining-channel oscillators through said grid connections to said impedance circuits so that oscillation of said adjoining-channel oscillators is inhibited and indicator means in the plate circuit of each of said oscillators.

3. An echo transmitter comprising receiver means, a plurality of frequency-discriminating channels selective of progressively different frequencies covering a band, each of said channels comprising an inductance-capacitance tank circuit tuned to one of said progressively different frequencies, an impedance circuit consisting of a capacitor in parallel with two resistors, rectifier means connecting said tank circuit to said impedance circuit, and impedances interconnecting a point of given polarity on said impedance circuit with a point of opposite polarity on the impedance circuit of each adjoining channel, and a normally idle oscillator in each channel connected to the impedance circuit of its channel and capable of being tripped by a received signal into operation at a frequency representing its related selective circuit, said oscillator comprising a three-element tube having a plate, a control grid and a cathode, said cathode being grounded, a piezo-electric crystal connected between the control grid and plate elements, a series resistance-capacitance circuit connected between said control grid and cathode elements, choke means in series with said plate, means for biasing said tube to cut-off, said oscillator continuing in sustained oscillation upon removal of such received signal and said impedances which interconnect with adjoining channels acting to apply sufficient bias to the oscillators in the adjoining channels to prevent the initiation of oscillation therein solely in response to the received signal which activated the oscillating channel.

4. The transmitter as defined in claim 3 further comprising means for transmitting a signal having frequency components corresponding to the frequency components of the received signal.

5. The transmitter as defined in claim 3 further comprising a second series of oscillators normally maintained in quiescent condition and adapted selectively to be tripped into operation by signals corresponding to the resultant of a received signal and the output signal of a selected first-named oscillator.

6. A frequency register comprising a plurality of distinct frequency channels, each channel associated with a predetermined frequency progressively different from those of its adjoining channels, and each channel comprising a frequency discriminator having maximum response at its predetermined frequency and a normally inoperative oscillator adapted to oscillate at said predetermined frequency when suitably activated, said frequency discriminator comprising a resonant circuit tuned to said predetermined frequency, rectifier means and filter means connected in series so that the A.C. output of said resonant circuit is converted into a D.C. bias across said filter means, said frequency discriminator further comprising impedance means interconnecting a point of given polarity on said filter means with a point of opposite polarity on the filter means in each adjoining frequency channel, said oscillator including means normally biasing said oscillator beyond cut-off, said oscillator being connected to the filter means of its channel so that an input signal to said discriminator having a frequency substantially the same as said predetermined frequency applies sufficient positive bias to said oscillator thru said filter means to overcome the inactivating bias and initiate sustained oscillation, said interconnecting impedance means thereupon acting to apply to the oscillators in said adjoining channels additional bias of such polarity as to prevent the initiation of oscillation therein solely in response to any actuating bias developed by said input signal in said adjoining channels.

References Cited in the file of this patent

UNITED STATES PATENTS

| | | |
|---|---|---|
| 1,315,539 | Carson | Sept. 9, 1919 |
| 1,779,259 | Meissner | Oct. 21, 1930 |
| 1,817,030 | Eberhard | Aug. 4, 1931 |
| 1,910,515 | Ballou | May 23, 1933 |
| 1,944,315 | Clapp | Jan. 23, 1934 |
| 2,173,154 | Bernard | Sept. 19, 1939 |
| 2,310,294 | Katzin | Feb. 9, 1943 |
| 2,412,227 | Och et al. | Dec. 10, 1946 |
| 2,417,834 | Lord | Mar. 25, 1947 |
| 2,426,021 | Hausz et al. | Aug. 19, 1947 |
| 2,454,845 | Sherman et al. | Nov. 30, 1948 |
| 2,505,182 | Haller | Apr. 25, 1950 |
| 2,513,760 | Toulon | July 4, 1950 |